July 10, 1945.  R. C. ULM  2,380,089
PRESSURE TANK
Filed Dec. 13, 1943  2 Sheets-Sheet 1
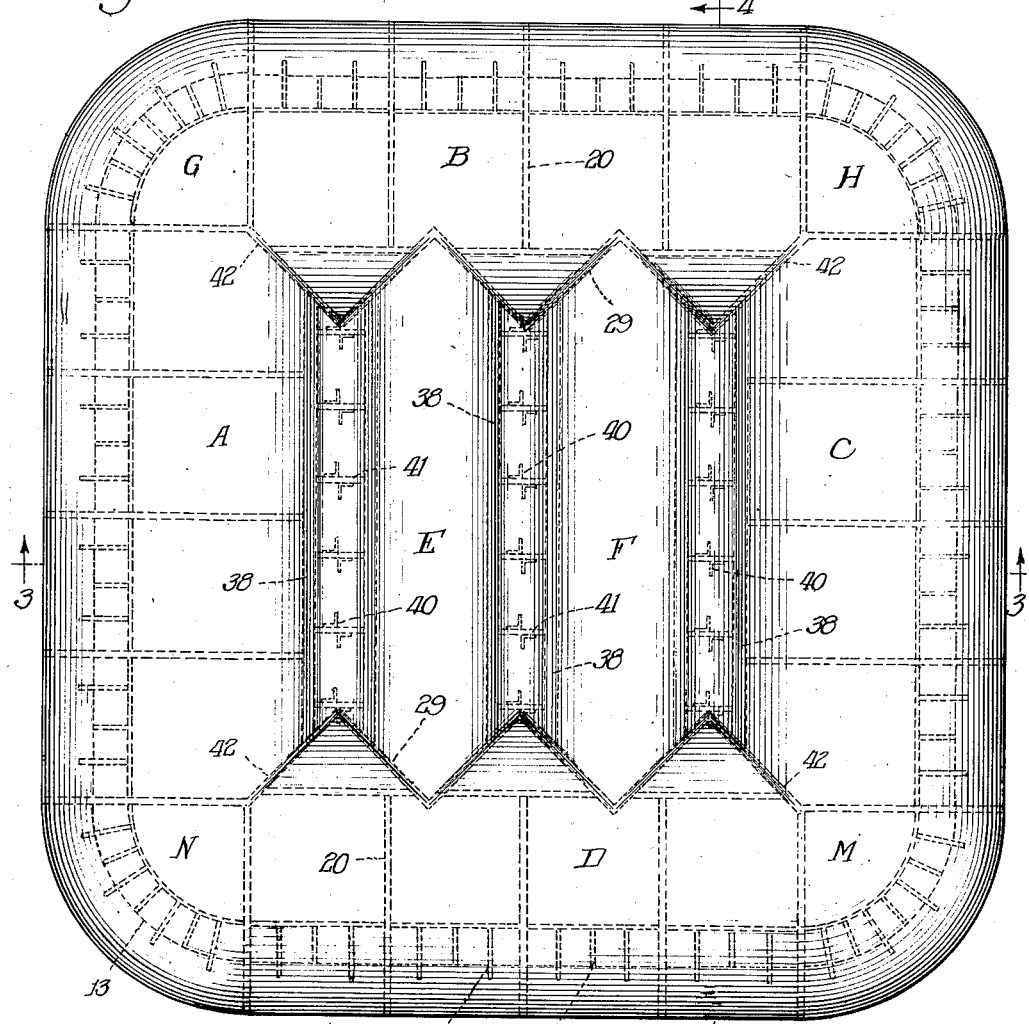

July 10, 1945.    R. C. ULM    2,380,089
PRESSURE TANK
Filed Dec. 13, 1943    2 Sheets-Sheet 2
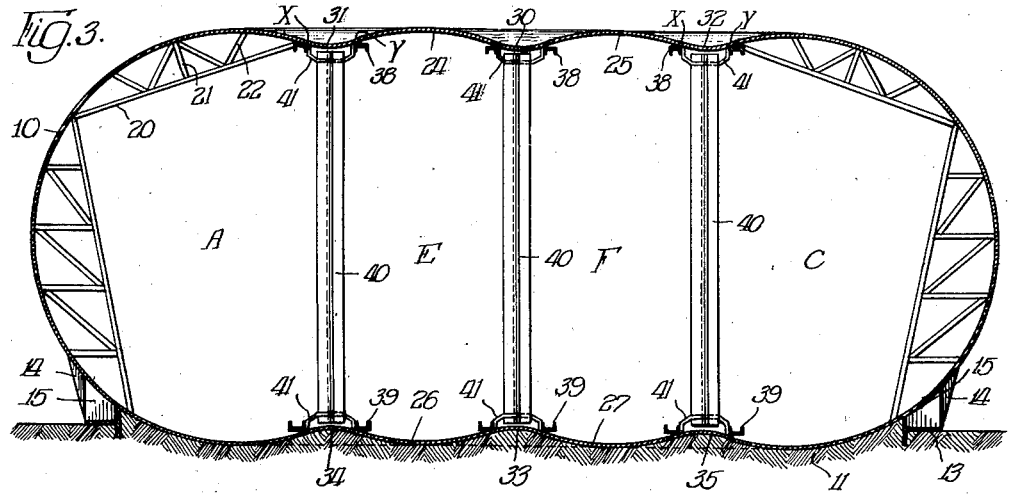
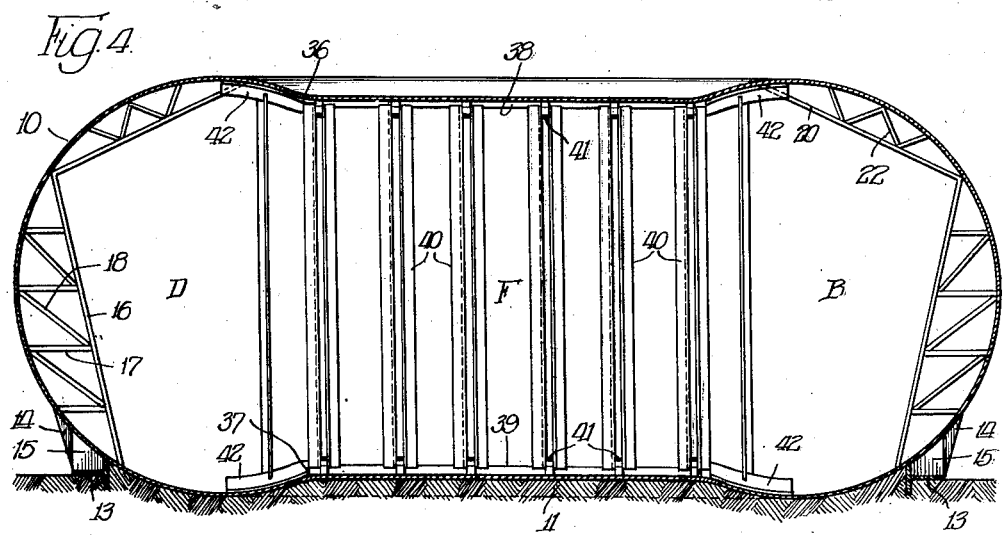
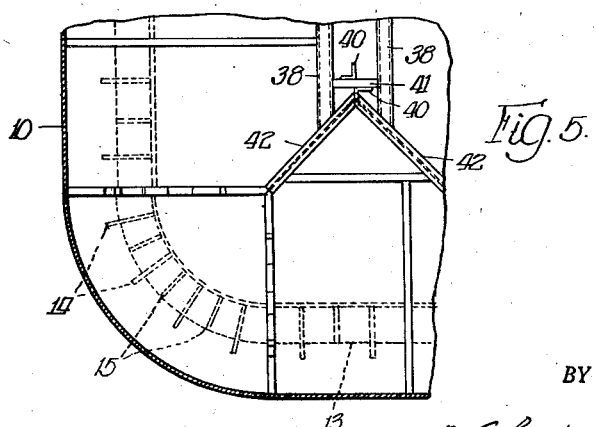
INVENTOR.
Reign C. Ulm,
BY Patented July 10, 1945

2,380,089

UNITED STATES PATENT OFFICE 2,380,089

PRESSURE TANK

Reign C. Ulm, East Chicago, Ind., assignor to Graver Tank & Mfg. Co., Inc., East Chicago, Ind., a corporation of Delaware Application December 13, 1943, Serial No. 514,028

5 Claims. (Cl. 220—1)

The invention relates to pressure tanks for storing volatile liquids and has reference more particularly to closed storage tanks having external surfaces of cylindrical contour.

An object of the invention is to provide a pressure tank comprising a combination of spherical portions connecting with segmental horizontal cylinders, certain of which cylinders have intersecting relation with each other.

Another object of the invention is to provide a pressure tank substantially square in plan and wherein spherical portions form the corners of the pressure tank and the sides and center are formed by segmental horizontal cylinders.

A still further object is to provide a pressure tank made up of connecting spherical portions and segmental horizontal cylinders and which is further characterized by the fact that adjacent parallel cylindrical surfaces join at an angle of one hundred and eighty degrees. The present construction of tank, therefore eliminates all sharp changes in curvature between adjacent parallel cylindrical surfaces and consequently the construction of the roof and bottom plate junctions is facilitated.

Another object is to provide a tank as described above wherein the roof includes inwardly curved surfaces for joining the upwardly curved surfaces of the parallel cylinders. One advantage of the one hundred and eighty degree plate junctions resulting from the use of said inwardly curved surfaces is the elimination of trusses in the central portion of the tank, and all reinforcements, girder sections and tie plates can be shop assembled, thus doing away with difficult welding positions in the field.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is an elevational view of the improved pressure tank of the invention;

Figure 2 is a top plan view with the internal bracing, supporting girders and ties being indicated by dotted lines;

Figure 3 is a sectional view taken on line 3—3 of Figure 2;

Figure 4 is a sectional view taken on line 4—4 of Figure 2; and

Figure 5 is a fragmentary top plan with the roof plates broken away to show details of the girder and beam supporting structures.

Referring to Figures 1 and 2 of the drawings, numeral 10 indicates the pressure tank of the invention suitably supported on the ground 11 and provided with the stairway 12. In plan view the pressure tank is substantially square, having rounded corners. As previously described, the tank is made up of intersecting spherical portions and segmental horizontal cylinders. More particularly, the outside periphery of the tank is formed by the segmental horizontal cylinders A, B, C and D, which alternate with spherical portions G, H, M and N. The sides of the tank are thus formed by the cylinders and the spherical portions comprise the corners. Segmental horizontal cylinders E and F form the central section of the tank and the same have connection with each other and with the cylinders A, B, C and D in a manner to be more particularly described.

The ground 11 is shaped to coincide with the undulating contour of the bottom of the tank and which has a contour similar to the roof. External shell stiffening means are employed, having connection with the tank at the ground level for holding the tank to its original shape under varying liquid and pressure loads. Said stiffening means include the beam member 13 suitably welded to the periphery of the tank. At intervals around the tank the angle member is provided with brackets or gusset plates 14 and 15 which additionally join the angle member to the tank.

Structural bracing within the tank is used for construction purposes as well as for holding the tank to its original shape when partially full of liquid under vapor pressure. The vertical bracing includes the tie rods 16, the horizontal struts 17 and the diagonal braces 18. The horizontal bracing is formed by the tie rods 20 and the vertical and diagonal struts 21 and 22.

As best shown in Figure 3, the center section of the tank comprising the segmental horizontal cylinders E and F, includes the upwardly curved roof portions 24 and 25 and downwardly curved bottom portions 26 and 27. Referring more particularly to the roof of the present tank, it will be observed that said portions 24 and 25 are connected by the downwardly curved surface 30 and in a similar manner downwardly curved surface 31 connects portion 24 with the cylindrical section A and the downwardly curved surface 32 connects portion 25 with the cylindrical section C. The downwardly curved portions 26 and 27 of the bottom are joined by an upwardly curved surface 33 and similar surfaces 34 and 35 join the respective portions to the cylinders A and C. The intersection of the center of the tank with the outside cylinders B and D presents a saw-tooth appearance identified by numeral 29 when viewed in plan, Figure 2.

Sharp changes in curvature are also avoided in the top and bottom of the tank by the provision of curved surfaces 36 and 37, as shown in Figure 4. Downwardly curved surfaces, such as 36, connect the top of the segmental cylinders B and D with the inwardly curved surfaces 30, 31 and 32. Upwardly curved surfaces, such as 37, perform a similar function in the bottom of the tank.

The present tank is characterized by the joining of all parallel cylindrical surfaces at an angle of one hundred and eighty degrees. This is accomplished by the provision of the inwardly curved surfaces which eliminate sharp changes in curvature. As a result of this construction the roof and bottom plate junctions are easily made. Another advantage of the one hundred and eighty degree plate junctions is in the reduction of uplift on the roof plates since twice as many curved roof sections are used. The need for trusses in the central portion of the tank is also eliminated and all reinforcements, girder sections and tie plates can be shop-assembled, thereby eliminating difficult welding positions in the field.

In accordance with the invention, the inwardly curved surfaces for the center section of the tank are held in shape by horizontal girders 38 for the roof and 39 for the bottom, the same being connected by the posts 40. The posts serve to hold the tank in its desired shape under pressure and are either in tension or under compression. In the absence of vapor pressure within the tank, the posts are under compression and act as columns. A horizontal girder 38 is located on each of the two longitudinal sides of each downwardly curved surface such as 30, 31 and 32, thereby providing a pair of such girders for each downwardly curved surface. The girders therefore sustain the points of connection, namely, $x$ and $y$, between the downwardly curved surfaces and the upwardly curved portions, preventing collapse thereof, and which plate junctions, as previously explained, are at an angle of one hundred and eighty degrees. The connecting tie plates 41 are located at intervals throughout the length of the girders 38 and 39 and the posts 40 are in turn secured at their ends to these tie plates.

The beams 42 have location on the saw-tooth intersections where the center portion of the tank including the cylindrical segments E and F join the outside cylinders B and D. The beams are shaped to conform to the curvature of the said intersecting surfaces. Each pair of beams 42 may be described as V-shaped, having suitable connection with spaced girders, as best shown in Figure 5.

All surfaces of the present pressure tank are cylindrical with the exception of the four corners which are formed by spherical surfaces. The construction has a minimum of sharp changes in curvature and consequently the roof and bottom plate junctions are easily made. The present design has several advantages over other types of pressure tanks. In the first place, the cylindrical shape of the several sections is very simple and of cheap construction since all plates can be rolled and need not be dished. Secondly, the plurality of cylinders utilize short radii of curvature, thereby minimizing plate thickness, and third, the smoothly curved roof permits easy installation of the drain pipes and the smooth curved bottom makes foundation building relatively simple.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a pressure tank, a closed container substantially rectangular in plane and formed of circular surfaces throughout, said container including spherical portions forming the corners, horizontal cylindrical sections forming the tank sides and at least one horizontal cylindrical segment comprising the center of the tank, inwardly curved connecting surfaces for joining the center cylindrical segment with the parallel sections forming the tank sides, supporting girders located at the junctions of said center segment with the parallel sections and being disposed on the respective sides of each inwardly curved surface, and posts extending vertically of the tank for connecting certain roof and bottom girders.

2. A pressure tank as defined by claim 1 additionally including inwardly curved surfaces for joining the cylindrical segment with the sections forming the tank sides which it intersects, and beams for supporting the inwardly curved surfaces along said intersections.

3. In a pressure tank, a closed container substantially rectangular in plan and formed of circular surfaces throughout, said container including spherical portions forming the corners and which connect with horizontal cylindrical sections forming the tank sides, cylindrical segments comprising the center of the tank and providing outwardly curved roof portions and outwardly curved bottom portions disposed in spaced parallel relation, inwardly curved connecting surfaces for joining the center cylindrical segments with each other and with the sections forming the tank sides, respectively, whereby the junctions of the curved roof portions of the tank and the junctions of the curved bottom portions thereof form angles of one hundred and eighty degrees to thus eliminate sharp changes in curvature, and supporting girders for each inwardly curved surface, said girders being disposed in parallel and being located on the respective sides of each inwardly curved surface to prevent collapse of said roof and bottom plate junctions.

4. In a pressure tank, a closed container formed of circular surfaces throughout and including spherical portions forming the corners and horizontal cylindrical sections forming the tank sides, cylindrical segments comprising the center of the tank and providing upwardly curved roof portions and downwardly curved bottom portions in spaced parallel relation, inwardly curved connecting surfaces for joining the center cylindrical segments with each other and with the sections forming the tank sides, respectively, whereby the junctions of the curved roof portions of the tank and the junctions of the curved bottom portions thereof form angles of one hundred and eighty degrees to thus eliminate sharp changes in curvature, supporting girders for each inwardly curved surface, said girders being disposed in parallel and being located on the respective sides of each inwardly curved surface to prevent collapse of said roof and bottom plate junctions, and posts extending vertically of the tank for connecting certain roof and bottom girders.

5. A closed pressure tank having top, bottom and side walls, each of said top and bottom walls including a plurality of spaced, outwardly curved surfaces substantially forming sections of parallel, horizontal cylinders, each of said top and bottom walls also including, between each pair of said spaced surfaces, an inwardly curved surface substantially forming a section of a horizontal cylinder which is longitudinally joined to and parallel with said other cylinders, the longitudinal junctions of the inwardly curved surfaces with the respective outwardly curved surfaces forming angles of one hundred and eighty degrees to thus eliminate sharp changes in curvature, a pair of girders for each inwardly curved surface, one such girder being located adjacent to each of the two longitudinal junctions of the respective inwardly curved surface with the other surfaces, secured thereto, and disposed in parallel therewith, structural means interconnecting each pair of girders and located at intervals throughout the length thereof, and posts connecting said structural means at the top with such structural means at the bottom of the tank, whereby said posts are under tension when the tank is under pressure and under compression when the tank is not under pressure.

REIGN C. ULM.